(12) United States Patent
Krishnan et al.

(10) Patent No.: US 12,172,089 B2
(45) Date of Patent: Dec. 24, 2024

(54) CONTROLLER ACTION RECOGNITION FROM VIDEO FRAMES USING MACHINE LEARNING

(71) Applicant: Sony Interactive Entertainment Inc., Tokyo (JP)

(72) Inventors: Rathish Krishnan, San Mateo, CA (US); Maulik Shah, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 616 days.

(21) Appl. No.: 17/307,971

(22) Filed: May 4, 2021

(65) Prior Publication Data
US 2022/0355211 A1    Nov. 10, 2022

(51) Int. Cl.
| | | |
|---|---|---|
| *A63F 13/86* | (2014.01) | |
| *A63F 13/33* | (2014.01) | |
| *A63F 13/40* | (2014.01) | |
| *G06N 3/045* | (2023.01) | |
| *G06N 20/00* | (2019.01) | |
| *G06V 20/40* | (2022.01) | |

(52) U.S. Cl.
CPC ............ *A63F 13/86* (2014.09); *A63F 13/33* (2014.09); *A63F 13/40* (2014.09); *G06N 3/045* (2023.01); *G06N 20/00* (2019.01); *G06V 20/46* (2022.01)

(58) Field of Classification Search
CPC ........ G06N 20/00; G06V 20/46; A63F 13/33; A63F 13/40; A63F 13/86
See application file for complete search history.

(56) References Cited

U.S. PATENT DOCUMENTS

| | | | | |
|---|---|---|---|---|
| 5,274,801 A | * | 12/1993 | Gordon | G06N 5/04 706/50 |
| 5,558,339 A | * | 9/1996 | Perlman | A63F 13/30 463/41 |
| 5,764,518 A | * | 6/1998 | Collins | B25J 9/1617 700/95 |
| 7,632,186 B2 | * | 12/2009 | Spanton | A63F 13/86 463/40 |
| 8,152,644 B2 | * | 4/2012 | Kert | A63F 13/814 463/42 |
| 10,569,174 B1 | * | 2/2020 | Wheeler | A63F 13/42 |
| 10,576,380 B1 | * | 3/2020 | Beltran | A63F 13/77 |
| 10,713,543 B1 | * | 7/2020 | Skuin | G06N 20/00 |
| 10,940,393 B2 | * | 3/2021 | Somers | G06N 20/00 |

(Continued)

OTHER PUBLICATIONS

"How to Show your Controller on OBS! Display Controller in LiveStream! Onscreen Controls OBS!" by Scobytech, published Apr. 20, 2018. Source: https://www.youtube.com/watch?v=VNKNJZ7d4Jc (Year: 2018).*

(Continued)

*Primary Examiner* — Steven J Hylinski
(74) *Attorney, Agent, or Firm* — John L. Rogitz; John M. Rogitz

(57) ABSTRACT

A machine learning model is used to receive a recorded video game for presentation on a spectator computer and to derive from the video identifications of controller operations during play of the game that resulted in the recorded video game. Indications of identified controller operations may be presented with the recorded video game to assist a viewer in learning how to play the game.

20 Claims, 5 Drawing Sheets

(56) References Cited

U.S. PATENT DOCUMENTS

| | | | | |
|---|---|---|---|---|
| 11,110,353 | B2* | 9/2021 | Somers | A63F 13/67 |
| 11,475,249 | B2* | 10/2022 | Skuin | G06V 20/42 |
| 2015/0231498 | A1* | 8/2015 | Hain | A63F 13/42 |
| | | | | 463/36 |
| 2016/0078339 | A1* | 3/2016 | Li | G06N 3/045 |
| | | | | 706/20 |
| 2017/0011554 | A1* | 1/2017 | Burba | G06T 15/20 |
| 2017/0127114 | A1* | 5/2017 | Lee | H04N 21/4516 |
| 2017/0289617 | A1* | 10/2017 | Song | H04N 21/4666 |
| 2018/0001205 | A1* | 1/2018 | Osman | A63F 13/5375 |
| 2018/0115743 | A1* | 4/2018 | McLoughlin | A63F 13/00 |
| 2018/0236361 | A1* | 8/2018 | Ninoles | H04N 21/43074 |
| 2019/0354759 | A1* | 11/2019 | Somers | A63F 13/67 |
| 2020/0269136 | A1* | 8/2020 | Gurumurthy | G06N 3/08 |
| 2020/0338445 | A1 | 10/2020 | Zhao et al. | |
| 2020/0349976 | A1 | 11/2020 | Wiggeshoff | |
| 2021/0295099 | A1* | 9/2021 | Huang | G06F 18/23 |

OTHER PUBLICATIONS

"International Search Report and Written Opinion", dated Sep. 6, 2022, from the counterpart PCT application PCT/US22/26947.

* cited by examiner

CONTROLLER ACTION RECOGNITION FROM VIDEO FRAMES USING MACHINE LEARNING

FIELD

The present application relates to technically inventive, non-routine solutions that are necessarily rooted in computer technology and that produce concrete technical improvements.

BACKGROUND

As understood herein, videos of previously-played computer games may be shared over a computer network to guide a viewer as to how to succeed in the game, such as by completing a level in the game. As further understood herein, such game videos may not include information as to what controller buttons were pressed and when during play of the game because the game videos may be recorded without capturing the controller actions as the game was being played.

SUMMARY

As also understood herein, such information about what controller buttons were pressed and when can be valuable to a player learning to play the computer game, making gaming more enjoyable for many types of gamers, from beginners to speed-runners. Machine learning techniques are provided herein to generate the controller action information by analyzing a series of video frames without additional controller data.

Accordingly, a device includes at least one computer memory that is not a transitory signal and that in turn includes instructions executable by at least one processor to receive a recorded computer simulation comprising sequences of video frames. The instructions are executable to process the sequences of video frames in a machine learning (ML) model, and receive, from the ML model, identification of computer simulation controller (CSC) operations associated with generating the recorded computer simulation. Additionally, the instructions are executable to present the recorded computer simulation on at least one audio video (AV) display along with at least one indication of at least one of the CSC operations received from the ML model.

In example embodiments the ML model includes at least one recurrent neural network (RNN) such as at least one long short-term memory (LSTM) network. Convolutional neural networks (CNN) can also be used.

The device may include the processor and the processor can be embodied in the AV display, or in a source of the computer simulation such as a computer simulation console and/or a server communicating with the AV display over a wide area computer network.

In another aspect, an apparatus includes at least one display configured to present video of at least one recorded computer simulation generated under control of at least one computer simulation controller. The recorded computer simulation, however, does not include information about operations of the computer simulation controller during generation of the video of the at least one recorded computer simulation. The apparatus accordingly includes at least one processor configured with instructions for identifying, from the video, information about operations of the computer simulation controller during generation of the video of the at least one recorded computer simulation. The instructions are executable for providing to the at least one display the information about operations of the computer simulation controller during generation of the video of the at least one recorded computer simulation for presentation thereof along with presenting the video of the at least one recorded computer simulation.

In example implementations the instructions may be executable for identifying, from the video, the information about operations of the computer simulation controller during generation of the video of the at least one recorded computer simulation using at least one machine learning (ML) model.

In another aspect, a method includes inputting to at least one machine learning (ML) model at least a training set. The training set includes sequences of video frames from plural recorded computer simulations and information associated with the sequences of video frames about computer simulation controller (CSC) operations executed during generation of the sequences of video frames. The method then includes inputting to the ML model at least a first recorded computer simulation which does not include information about CSC operations executed during generation of the first recorded computer simulation. The method includes presenting the first recorded computer simulation along with audible and/or visible information about CSC operations executed during generation of the first recorded computer simulation as received from the ML model.

The details of the present application, both as to its structure and operation, can best be understood in reference to the accompanying drawings, in which like reference numerals refer to like parts, and in which:

DETAILED DESCRIPTION

Figure 1:
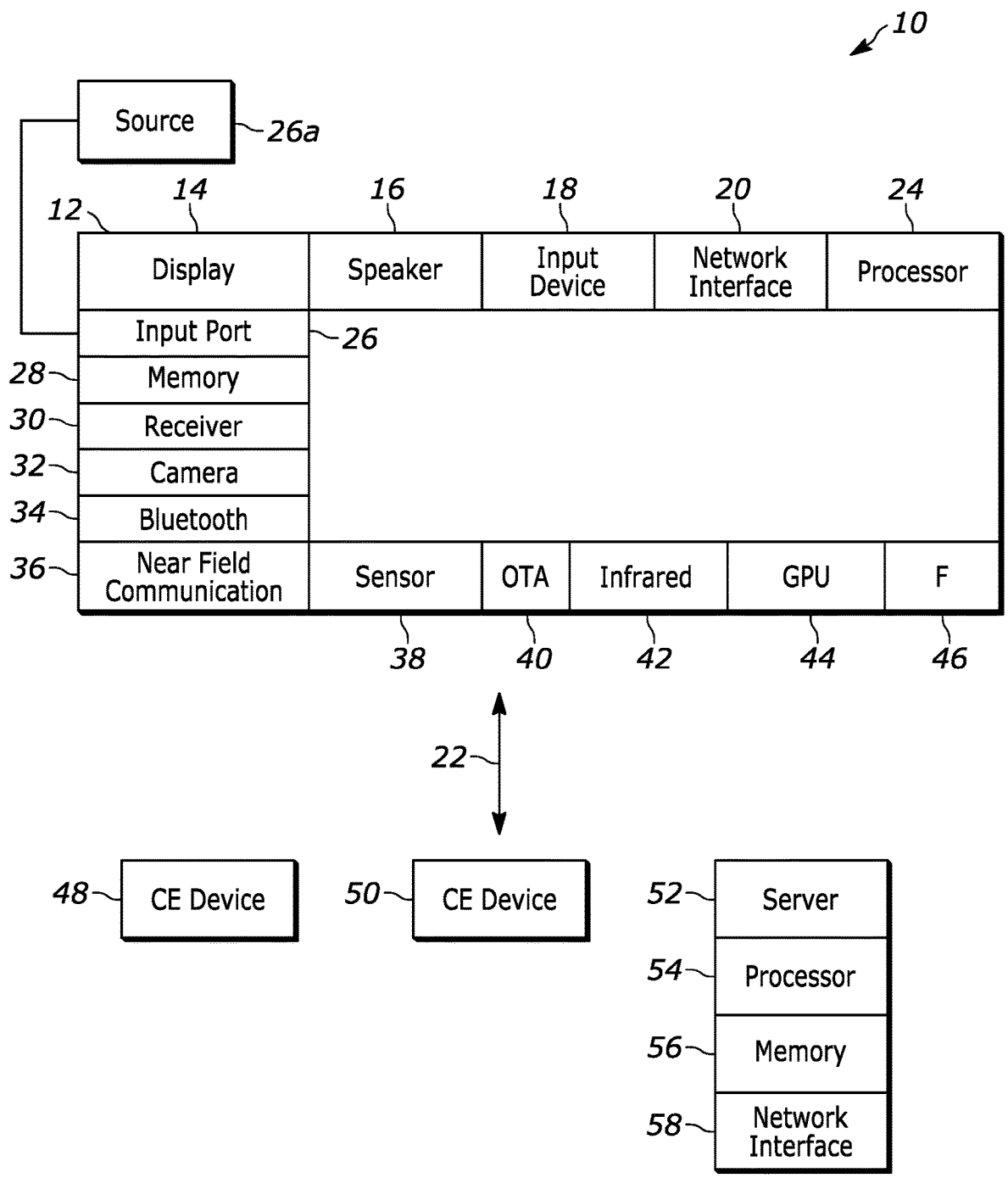
FIG. 1 is a block diagram of an example system including an example in accordance with present principles.

Present principles may employ machine learning models, including deep learning models. Machine learning models use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), recurrent neural network (RNN) which may be appropriate to learn information from a series of images, and a type of RNN known as a long short-term memory (LSTM) network. Support vector machines (SVM) and Bayesian networks also may be considered to be examples of machine learning models.

As understood herein, performing machine learning involves accessing and then training a model on training data to enable the model to process further data to make predictions. A neural network may include an input layer, an output layer, and multiple hidden layers in between that that are configured and weighted to make inferences about an appropriate output.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. A graphics processor may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input ports 26 such as a high-definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26*a* of audio video content. Thus, the source 26*a* may be a separate or integrated set top box, or a satellite receiver. Or the source 26*a* may be a game console or disk player containing content. The source 26*a* when implemented as a game console may include some or all of the components described below in relation to the CE device 44.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimensions.

Continuing the description of the AVD 12, in some embodiments the AVD 12 may include one or more cameras 32 that may be a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a motion sensor such as an accelerometer, gyroscope, cyclometer, or a magnetic sensor, an infrared (IR) sensor, an optical sensor, a speed and/or cadence sensor, a gesture sensor (e.g., for sensing gesture command), providing input to the processor 24. The AVD 12 may include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

The components in ensuing figures may include some or all components shown in FIG. 1.

Figure 2:
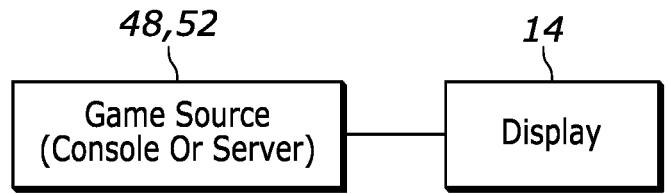
FIG. 2 illustrates an example game controller with example keys operation of which may be learned from recorded computer simulation (such as computer game) video consistent with present principles.
Figure 2:
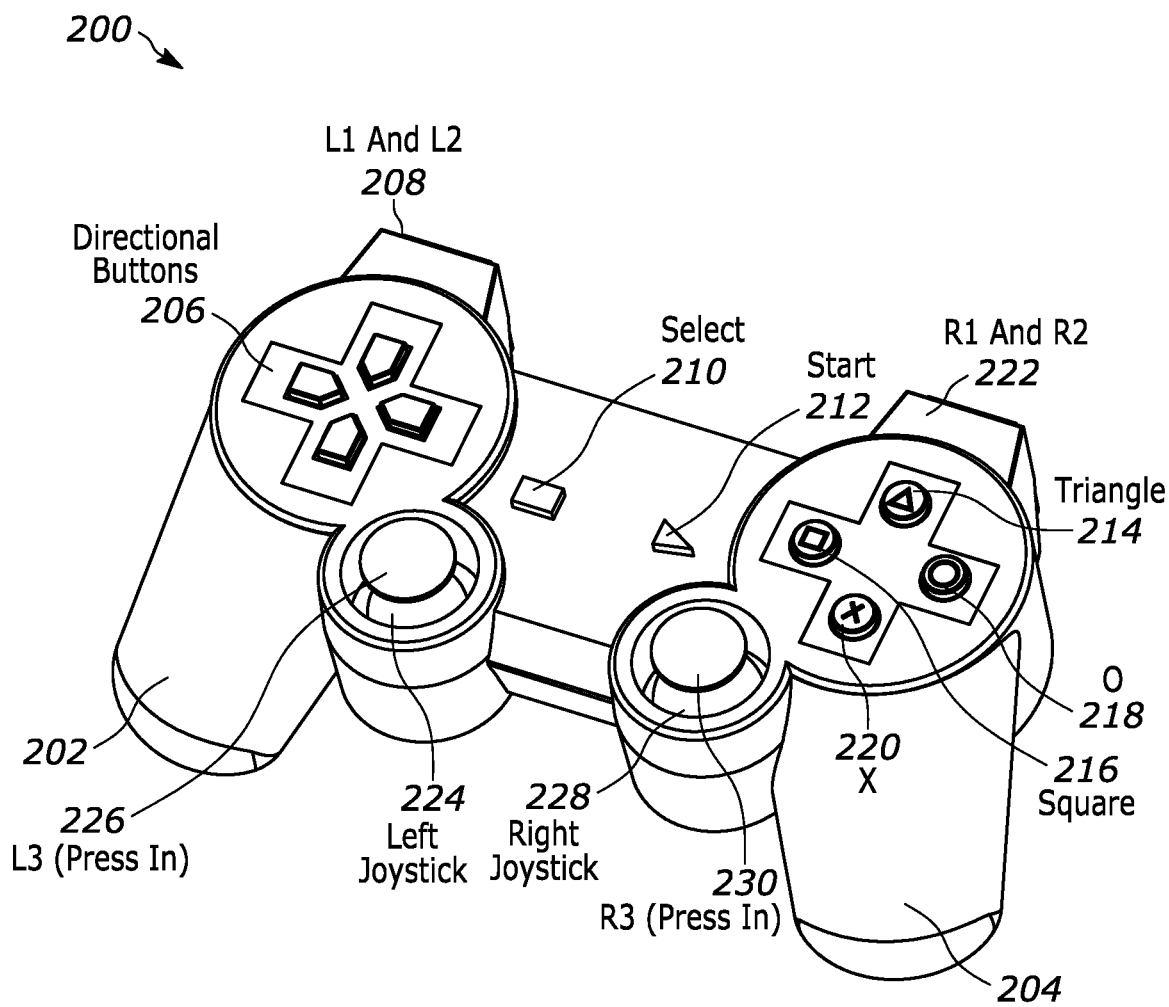

FIG. 2 illustrates a non-limiting example of a game controller that may be used according to present principles to control a computer simulation such as a computer game during play of the game, with the video of the game (and also audio/haptics etc.) associated with the game being shown on a display such as the display 14 (in the case of haptics, generated for tactile detection using, e.g., a controller) and also being recorded for playback on, e.g., the computer memory 28 shown in FIG. 1 and/or server memory 56 shown in FIG. 1.

It is to be understood that a game controller can incorporate one or more of the components discussed above to communicate with a source of a computer simulation (such as the CE device 48 embodied as a computer game console and/or the server 52) to control a computer game presented on the display 14.

FIG. 2 shows a controller 200 that includes a lightweight hand-held housing with round, generally cylindrically-shaped left and right handles 202, 204, each defining a top surface on which four manipulable keys disposed thereon. For example, four directional keys 206 are arranged in a cruciform pattern on the top of the left handle 202. The keys 206 can be used to cause an object to move in the respective direction on a display.

Additional L1 and L2 keys 208 may be provided just forward of the left handle 202. A bridge connects the handles 202, 204 and a select key 210 may be disposed on the bridge along with a start key 212.

The four keys on the right handle 204 may include a triangle key 214, a square key 216, and "O" key 218, and an "X" key 220, each of which may assume a respective function according to the game designer's wishes. Additional R1 and R2 keys 222 may be provided just forward of the right handle 204.

Also, between the handles 202, 204 a left joystick 224 may be provided just inboard of the left handle 202. The left joystick 224 may include a depressible top 226. Likewise, a right joystick 228 may be provided just inboard of the right handle 204. The right joystick 228 may include a depressible top 230.

Figure 3:
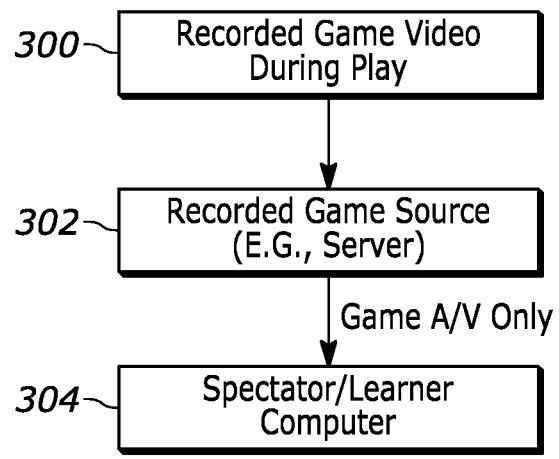
FIG. 3 illustrates an example for viewing a recorded computer simulation such as a computer game consistent with present principles.

FIG. 3 illustrates a device 300 that records computer simulation (such as computer game) video and if desired audio and haptics associated with the video. The device 300 may be implemented by, for example, the device on which the game is played to generate the video, a computer game console, a computer game server remote from the player, or combination thereof.

The recorded computer simulation (such as a computer game) is provided to a source 302 of recorded computer games. The source 302 provides the recorded video (and if desired recorded audio and other sensory outputs of the game, herein referred to for short as audio video) to a spectator/learner computer device 304.

Because the computer game AV may have been recorded without recording the operations of the computer game controller that were input to control the game during recording, a machine learning (ML) engine 306 is provided for execution consistent with principles herein to reproduce the controller operations from the computer game audio video for presenting indications thereof on the spectator/learner computer 304 along with the recorded game AV. The ML model 306 may include at least one recurrent neural network (RNN) such as at least one long short-term memory (LSTM) network. Convolutional neural networks (CNN) also may be used. The ML model 306 may be executed by any of the processors disclosed herein or combinations thereof, such as the processor in the spectator/learner computer 304, the recorded game source 302 (such as a remote server or local game console), etc. Note that in some embodiments, elements 300, 302 and 304 may be implemented by the same device. For instance, a user might try to learn from game recording of a different user who had played earlier on the same console.

Figure 4:
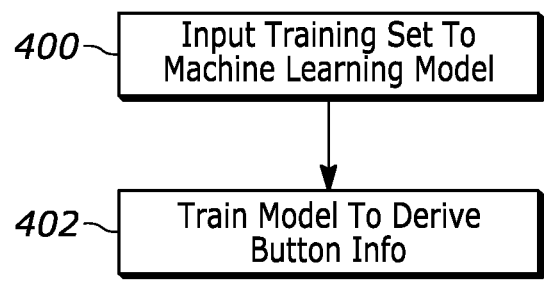
FIG. 4 illustrates example logic in example flow chart format for training a machine learning (ML) model to derive, from recorded computer simulation video, information as to what controller operations were performed and when they were performed.

FIG. 4 illustrates logic for training the ML model 306 in FIG. 3. At block 400 a training set of data is input to the ML model. The training set may include video and/or audio associated with typically plural computer simulations such as computer games.

With greater specificity, the training set can include sequences of video frames from plural recorded computer simulations and/or, if desired, audio associated with the video. Moreover, the training set includes ground truth information associated with the sequences of video frames about computer simulation controller (CSC) operations executed during generation of the sequences of video frames. A CSC operation may result from manipulation of any one or more of the controls shown in example FIG. 2, for instance. From the training set and employing appropriate learning techniques (e.g., supervised, unsupervised, semi-supervised, etc.) the ML model 306 learns CSC operations from video frame sequences at block 402.

Figure 5:
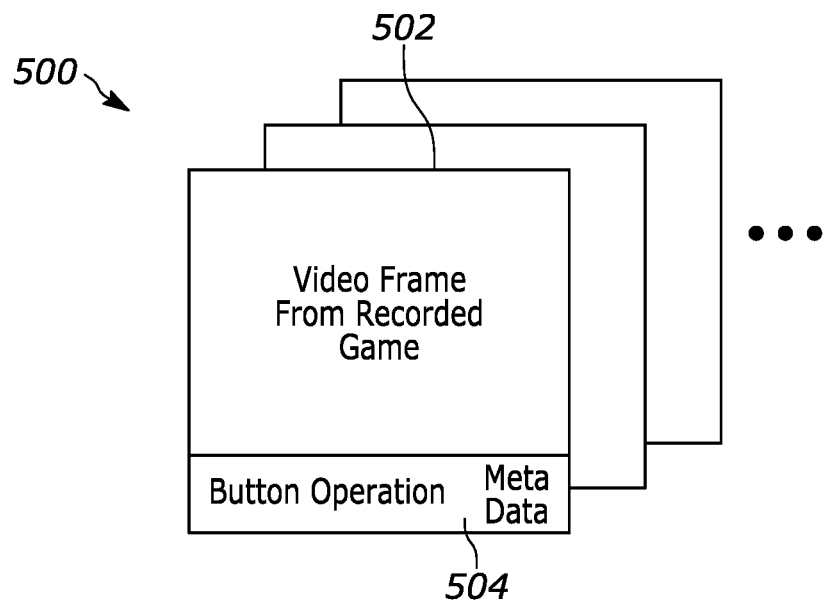
FIG. 5 schematically illustrates a sequence of video frames with attendant information about controller operations that may be used to train the ML model.

FIG. 5 illustrates a sequence 500 of video frames 502 in a training set that is used to train the ML model. Metadata 504 is associated with the sequence 500, if desired on a frame-by-frame basis, indicating what and when controller operations occurred during recording of the training sequence. Note that in some embodiments, the metadata need not be frame-by-frame. It may be updated only if the CSC operation has changed compared to the previous frame. Also, the CSC operations can be stored in a separate file completely along with timestamps that could be used to synchronize the video data and the CSC data. The metadata 504 may include indications of what specific control surfaces, e.g., on a controller such as the controller shown in FIG. 2, were manipulated and when those control surfaces were manipulated during generation of the recorded sequence 500.

The training set may be created in various ways. Ground truth of button manipulation may be gathered during game play and associated with the generated video in time-alignment for use as part of the training set. The training set may also include prerecorded game videos that have controller overlays on them which are generated as the original game is played and presented with the video. The controller operation data in the overlays is already time-aligned with the video because it is typically presented on the video. Pixel values in the video may be checked for each frame to ascertain what buttons were pressed as indicated in the overlay to generate labeling data. This also gives timing data since each frame may be associated with a timestamp. The overlay feature can be turned on at initial play when the training set video is generated.

Ground truth controller operations may be streamed from a controller to a device recording a game video under control of the controller to associate the ground truth controller operations with the video for establishing an element of the training set.

Figure 6:
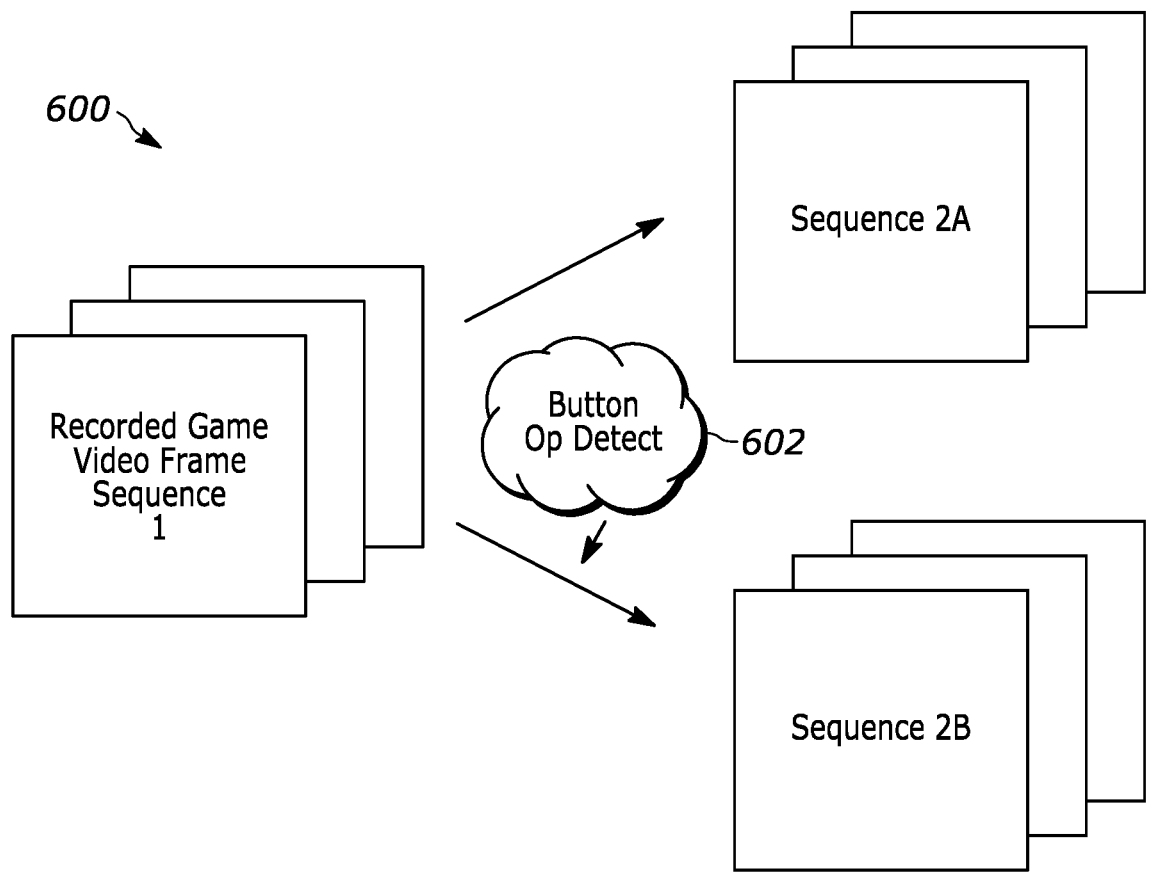
FIG. 6 schematically illustrates a sequence of video frames without attendant information about controller operations and alternate video paths that can occur depending on controller operations, indicating identification of a controller operation.

Subsequent to training, the ML model may be used for receiving a first recorded computer simulation with sequences 600 of video frames (FIG. 6, not showing optional audio for clarity) that does not include information about CSC operations executed during generation of the first recorded computer simulation. Depending on how the sequences of video frames evolve, the ML model identifies what CSC operations were made during generation of the first recorded simulation and when they were made, based on the training from FIG. 5. For example, as between sequence 1 shown in FIG. 6 and potential sequence 2A, no CSC controller operations may have occurred. On the other hand, as between sequence 1 and potential sequence 2B (a different sequence than potential sequence 2A), a CSC operation may have been performed to cause the overall sequence to deviate from sequence 1-sequence 2A to sequence 1-sequence 2B, and identification 602 of such CSC operation is made by the ML model.

Figure 7:
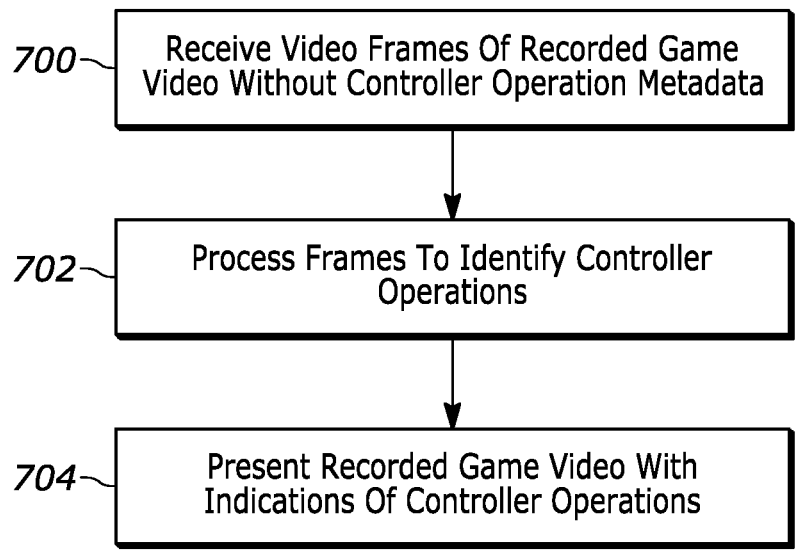
FIG. 7 illustrates example logic in example flow chart format for identifying controller operations from a sequence of recorded video frames from a recorded computer simulation.

FIG. 7 illustrates the above principles in example flow chart format. The logic of FIG. 7 may be executed by any one or more of a processor embodied in the spectator/learner AV display 304, and/or the source 300 of the generated computer simulation and/or source 302 of the recorded computer simulation, either one or both of which may be instantiated as computer simulation consoles or servers communicating with AV displays over a wide area computer network such as the Internet.

It is to be understood that in addition to the below, blocks may be provided for Preprocessing and Downscaling to reduce the time needed for the ML Model to identify the CSC operations, as well as Postprocessing and Synchronization to filter out unsupported CSC operations and adjust for latency.

Block 700 indicates receiving a recorded computer simulation such as a recorded computer game that includes sequences of video frames and/or an accompanying audio soundtrack. Typically, the recorded simulation does not include information about operations of the computer simulation controller during generation of the recorded computer simulation. The sequence of frames may be, e.g., a snippet of game video from an Internet platform.

Moving to block 702, the recorded computer simulation, e.g., the sequences of video frames in the recorded simulation, is processed through the ML model 306 in FIG. 3, trained as disclosed in reference to FIG. 4. The ML model identifies, and outputs indications of computer simulation controller (CSC) operations associated with generating the recorded computer simulation in accordance with its training, which are received and associated with the recorded computer simulation. A CSC operation identified by the ML model may include, e.g., what control element in example FIG. 2 was manipulated, and when.

Moving to block 704, the recorded computer simulation is presented on at least one audio video (AV) display such as the spectator/learner computer 304 in FIG. 3, along with at least one indication of at least one of the CSC operations received from the ML model.

Figure 8:
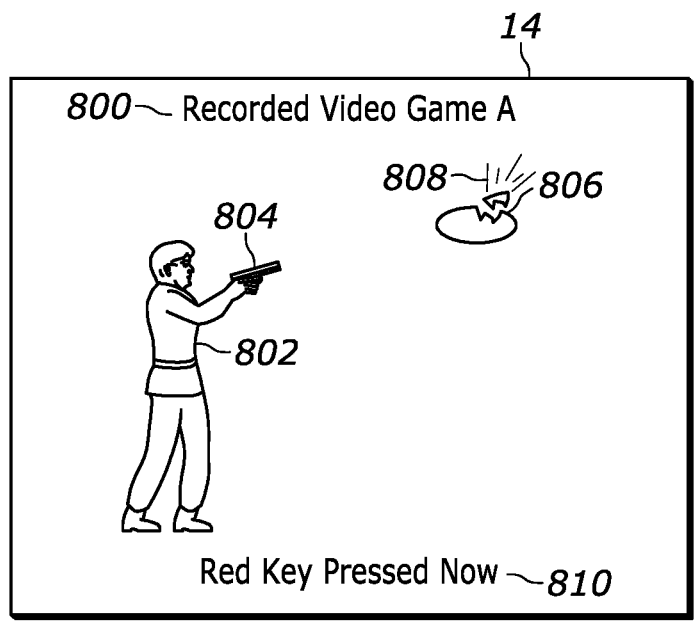
FIG. 8 illustrates an example output presentation from the ML model consistent with present principles.

FIG. 8 illustrates. A recorded video game 800 may be presented on a display such as the display 14 shown in FIG. 1. In the illustration, the game 800 includes a character 802 shooting a weapon 804 at a flying object 806. Lines 808 indicate that the object 806 has been hit.

An indication 810 is presented on the display indicating what CSC operation occurred ("red key pressed") and when it occurred in the game, in the example shown, "now", it being understood that the indication 810 may indicate a past CSC operation that led to the explosion and the time of the operation and also an upcoming CSC operation to look for. The indication 810 may be visibly presented as shown and/or audibly on speakers associated with the display. The recorded computer simulation is thus presented along with information received from the ML model about CSC operations executed during generation of the recorded computer simulation.

The above logic may be provided as a plug-in with a computer game controller or other feature to enable gamers to download game videos and obtain information about sequences of controller operations that produced the videos.

It will be appreciated that whilst present principals have been described with reference to some example embodiments, these are not intended to be limiting, and that various alternative arrangements may be used to implement the subject matter claimed herein.

What is claimed is:

1. A device comprising:
   at least one computer memory that is not a transitory signal and that comprises instructions executable by at least one processor to:
   receive a recorded computer simulation comprising sequences of video frames;
   process the sequences of video frames in a machine learning (ML) model;
   receive, from the ML model, identification of at least some computer simulation controller (CSC) operations associated with generating the recorded computer simulation, at least one identification of a CSC operation comprising an identification of what manual control element on a CSC was operated; and
   present the recorded computer simulation on at least one audio video (AV) display along with at least one indication of at least one of the CSC operations received from the ML model.

2. The device of claim 1, wherein the ML model comprises at least one recurrent neural network (RNN).

3. The device of claim 2, wherein the RNN comprises at least one long short-term memory (LSTM) network.

4. The device of claim 1, wherein the ML model comprises at least one convolutional neural network (CNN).

5. The device of claim 1, comprising the at least one processor, wherein the at least one processor is embodied in the AV display.

6. The device of claim 1, comprising the at least one processor, wherein the at least one processor is embodied in a source of the computer simulation.

7. The device of claim 6, wherein the source comprises at least one computer simulation console.

8. The device of claim 6, wherein the source comprises at least one server communicating with the AV display over a wide area computer network.

9. The device of claim 1, wherein the indication of at least one CSC operation comprises what control element on a CSC was manipulated, and when in the future to manipulate the control element.

10. The device of claim 1, wherein the indication of at least one CSC operation comprises text.

11. The device of claim 1, wherein the indication of at least one CSC operation comprises an indication of an upcoming CSC operation to look for.

12. An apparatus comprising:
    at least one display configured to present at least video of at least one recorded computer simulation generated under control of at least one computer simulation controller and not including information about operations of the computer simulation controller during generation of the video of the at least one recorded computer simulation; and
    at least one processor configured with instructions for:
    identifying, from the video, information about operations of the computer simulation controller during generation of the video of the at least one recorded computer simulation; and
    providing to the at least one display the information about operations of the computer simulation controller during generation of the video of the at least one recorded computer simulation for presentation thereof along with presenting the video of the at least one recorded computer simulation, wherein the information about operations of the computer simulation controller comprises at least one identification of when a manual control element on a computer simulation controller was operated.

13. The apparatus of claim 12, wherein the processor is embodied in the display.

14. The apparatus of claim 12, wherein the processor is embodied in a computer simulation console.

15. The apparatus of claim 12, wherein the processor is embodied in a server communicating with the display over a wide area network.

16. The apparatus of claim 12, wherein the instructions are executable for:
    identifying, from the video, the information about operations of the computer simulation controller during generation of the video of the at least one recorded computer simulation using at least one machine learning (ML) model.

17. The apparatus of claim 16, wherein the ML model comprises at least one recurrent neural network (RNN).

18. The apparatus of claim 17, wherein the RNN comprises at least one long short-term memory (LSTM) network.

19. The apparatus of claim 12, wherein the information about operations of the computer simulation controller comprises what control element on the computer simulation controller was manipulated, and when in the future to manipulate the control element.

20. The apparatus of claim 12, wherein the information about operations of the computer simulation controller comprises an indication of an upcoming computer simulation controller operation to look for.

* * * * *